United States Patent
Lee et al.

(10) Patent No.: US 7,233,949 B2
(45) Date of Patent: Jun. 19, 2007

(54) SYSTEM AND METHOD FOR CONTROLLING USER AUTHORITIES TO ACCESS ONE OR MORE DATABASES

(75) Inventors: Chung-I Lee, Tu-Chen (TW); Da-Peng Lee, Sheenzhen (CN)

(73) Assignees: Hong Fu Jin Precision Ind. (Shenzhen) Co., Ltd., Shenxzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 473 days.

(21) Appl. No.: 10/856,096

(22) Filed: May 28, 2004

(65) Prior Publication Data

US 2004/0243851 A1 Dec. 2, 2004

(30) Foreign Application Priority Data

May 28, 2003 (TW) ............................... 92114488 A

(51) Int. Cl.
*G06F 17/30* (2006.01)
*G06F 7/00* (2006.01)
(52) U.S. Cl. ...................... 707/9; 707/103 R; 713/155
(58) Field of Classification Search ................ 707/1–5, 707/9, 10, 101–103 R, 104.1; 706/3, 4, 5, 706/12; 713/155, 157, 167, 168
See application file for complete search history.

(56) References Cited

U.S. PATENT DOCUMENTS

| | | | |
|---|---|---|---|
| 5,696,898 A * | 12/1997 | Baker et al. ................... 726/12 |
| 5,701,458 A | 12/1997 | Bsaibes et al. | |
| 5,911,143 A * | 6/1999 | Deinhart et al. ......... 707/103 R |
| 6,041,412 A * | 3/2000 | Timson et al. .................. 726/3 |
| 6,189,103 B1 * | 2/2001 | Nevarez et al. ................ 726/5 |
| 6,308,181 B1 * | 10/2001 | Jarvis .......................... 707/102 |
| 6,453,353 B1 * | 9/2002 | Win et al. .................... 709/229 |
| 6,470,353 B1 | 10/2002 | Yaung et al. | |
| 6,792,425 B2 * | 9/2004 | Yagawa et al. ............... 707/10 |
| 2002/0007411 A1 * | 1/2002 | Shaked et al. .............. 709/229 |

* cited by examiner

*Primary Examiner*—Jeffrey Gaffin
*Assistant Examiner*—Jacques Veillard
(74) *Attorney, Agent, or Firm*—Wei Te Chung

(57) ABSTRACT

A system for controlling user authorities to access one or more databases includes at least one client computer (1), at least one administrator computer (4), an application server (3), a database server (5), and a system database (6). The application server includes an authority setting module (31), an authority verification module (32), a data management module (33), and an authority modifying module (34). The authority setting module is provided for defining system operations, user types and user authorities for ACLs (access control lists). Each ACL includes a database name list (105), a user name list (106), a user type list (107), a user authority list (108), and an ACL modifying interface (109). The system database stores a plurality of ACLs, operation definition data, type definition data, and authority definition data. A related method for adding, deleting and/or modifying authorities of a user by using ACLs is also disclosed.

7 Claims, 5 Drawing Sheets

SYSTEM AND METHOD FOR CONTROLLING USER AUTHORITIES TO ACCESS ONE OR MORE DATABASES

BACKGROUND OF THE INVENTION

1. Field of the Invention

The present invention relates to systems and methods for managing data processing systems, and especially to a system and method for controlling user authorities to access one or more databases in a data processing system.

2. Background of Related Art

In data access management, it has often been found desirable to limit various authorizations or permissions granted to users. For example, it may be desirable to limit access by certain users or groups of users to certain directories only, or to certain files only within a database of a data processing system. This helps prevent unauthorized use of sensitive data, and helps prevent damage to the data processing system through inadvertent alteration or deletion of data or other files. Examples of different permissions are authority to read, write or execute files, data or directories, and authority to modify other users' permissions and authorities.

One system used to manage access to data in a data processing system is a file system employing Access Control Lists (ACLs). ACLs identify which users may access an object such as a file or directory, and identify the type of access that a user has for a particular object. A network manager or system operator may alter such ACLs to change what a user may have access to, the type of access available, and the operations that the user is authorized to perform on the accessed data.

U.S. Pat. No. 5,701,458 entitled "System and Method for Managing Arbitrary Subsets of Access Control Lists in a Computer Network" and issued on Dec. 23, 1997 discloses a system and method for managing access to objects organized in a hierarchical structure in a data processing system. The system permits manipulation of an arbitrary set of ACLs and individual entries within an ACL. A set of actions covering all possible entry updates provides flexibility in manipulating ACLs and removing latent ambiguity. By permitting operation on the arbitrary set of ACLs rather than a resource tree, heterogeneous trees remain after an apply function. A mechanism is provided for identifying specific failures of ACL updates by resource name and error, and thereby permitting correction without necessitating re-running of the entire apply function.

However, the above-described system and method does not provide for operations such as reading, writing and modifying permissions and authorities to be assigned to a single authority. Furthermore, administrators of the system cannot set authorities of different users according to particular contents of various different databases. This can cause inconvenience for the administrators, who may sometimes be required to temporarily alter a user's authority to allow access for the user to a specific database on a particular occasion only. Accordingly, it is desired to provide a system and method which overcomes the above-mentioned problems and difficulties.

SUMMARY OF THE INVENTION

A general object of the present invention is provide a system and method for conveniently controlling user authorities to access one or more databases.

According to a preferred embodiment of the present invention, a system for controlling user authorities to access one or more databases comprises at least one client computer, at least one administrator computer, an application server, a database server, and a system database. The application server comprises an authority setting module, an authority verification module, a data management module, and an authority modifying module. The authority setting module is provided for defining system operations, user types and user authorities for ACLs (access control lists). Each of the ACLs includes a database name list, a user name list, a user type list, a user authority list, and an ACL modifying interface. The system database is for storing a plurality of ACLs, operation definition data, type definition data, and authority definition data.

Further, the present invention provides a method for adding, deleting and modifying a plurality of authorities regarding one user by using ACLs. The method typically comprises the steps of: selecting one or more databases for which an administrator wants to change the contents of user authorities; displaying ACLs of the selected databases; inputting a user name; selecting deleting or adding a user type or user authority; assigning a user type; assigning a user authority; and executing the above described procedures.

Other objects, advantages and novel features of the present invention will be drawn from the following detailed description of the preferred embodiment and a preferred method of the present invention with the attached drawings, in which:

DETAILED DESCRIPTION OF THE INVENTION

Figure 1:
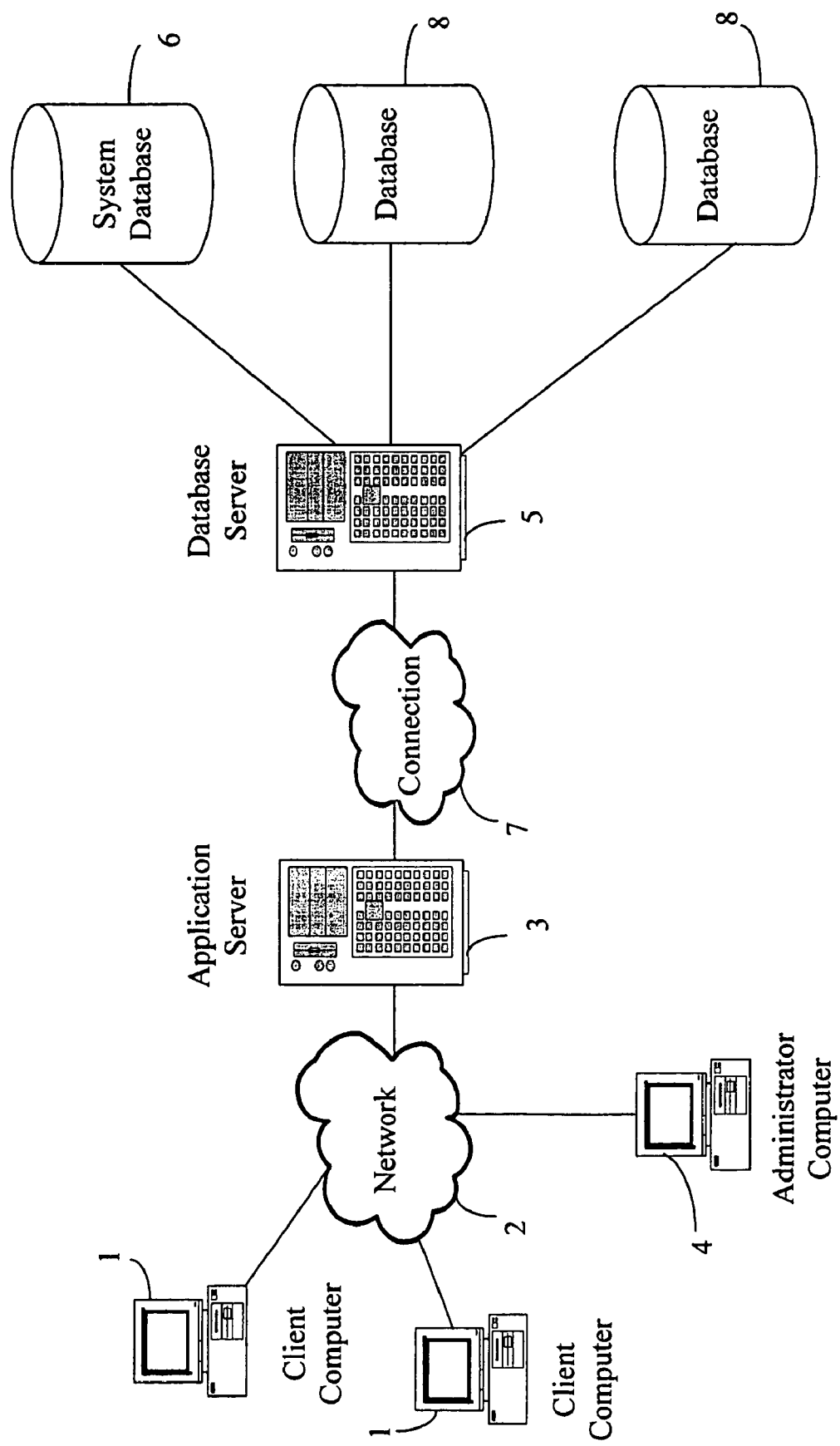
FIG. 1 is a schematic diagram of hardware architecture of a system for controlling user authorities to access one or more databases in accordance with the preferred embodiment of the present invention.

FIG. 1 is a schematic diagram of hardware architecture of a system for controlling user authorities to access a database in accordance with the preferred embodiment of the present invention. The system comprises a plurality of client computers 1, a plurality of administrator computers 4 (only one shown), an application server 3, a database server 5, a system database 6 and a plurality of databases 8. The client computers 1 and administrator computers 4 are connected with the application server 3 via a network 2, which may be an intranet, the Internet or any other suitable electronic communications network. The database server 5 is connected to the application server 3 through a connection 7. The connection 7 is database connectivity such as an Open Database Connectivity (ODBC) or a Java Database Connectivity (JDBC).

Figure 2:
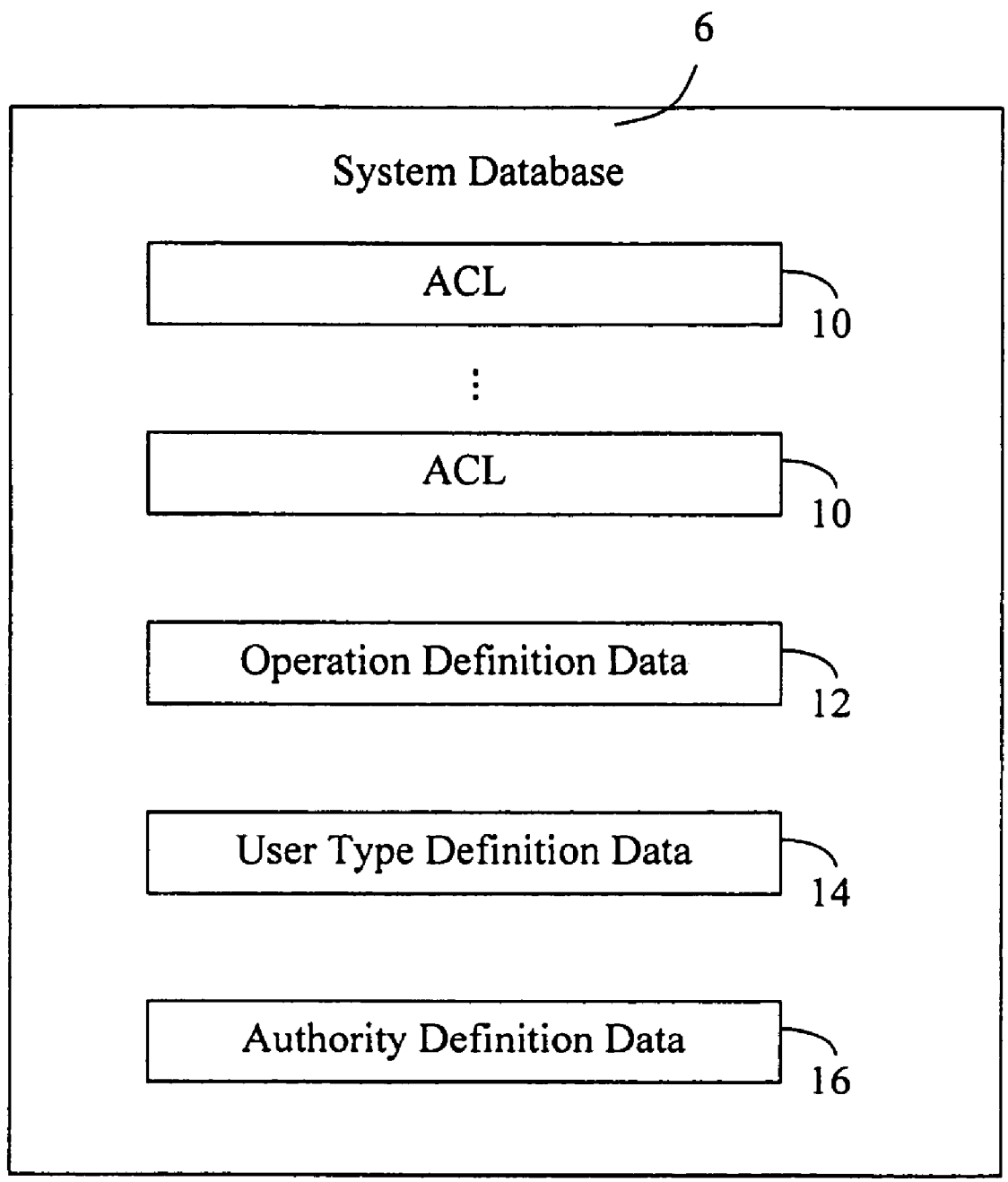
FIG. 2 is a schematic diagram showing data stored in a system database of the system of FIG. 1.

FIG. 2 is a schematic diagram showing data stored in the system database 6. The system database 6 stores a plurality of access control lists (ACLs) 10, operation definition data 12, user type definition data 14, and authority definition data 16. Each access control list 10 corresponds to a respective database 8, and records access control authorities to the database 8. The access control list 10 comprises columns such as Database Name, User Name, User Type, and User Authority. The operation definition data 12 stores predetermined system operations. Such system operations comprise editing users and databases, and assigning user authorities and databases to corresponding users. The user type definition data 14 stores predefined user types. Such user types comprise Individual User, Group User, and Invalid User. The authority definition data 16 stores predefined authorities, and operations that can be performed by each authority. The authorities include readers, editors, writers and administrators. Readers can only read contents of relevant authorized databases 8. Editors can read, add, delete and modify the contents of the relevant authorized databases 8. Writers can not only read the contents of the relevant authorized databases 8, but also create new databases 8. Administrators can modify any information displayed in the ACLs 10, but cannot perform any operation on the contents of the databases 8.

Figure 3:
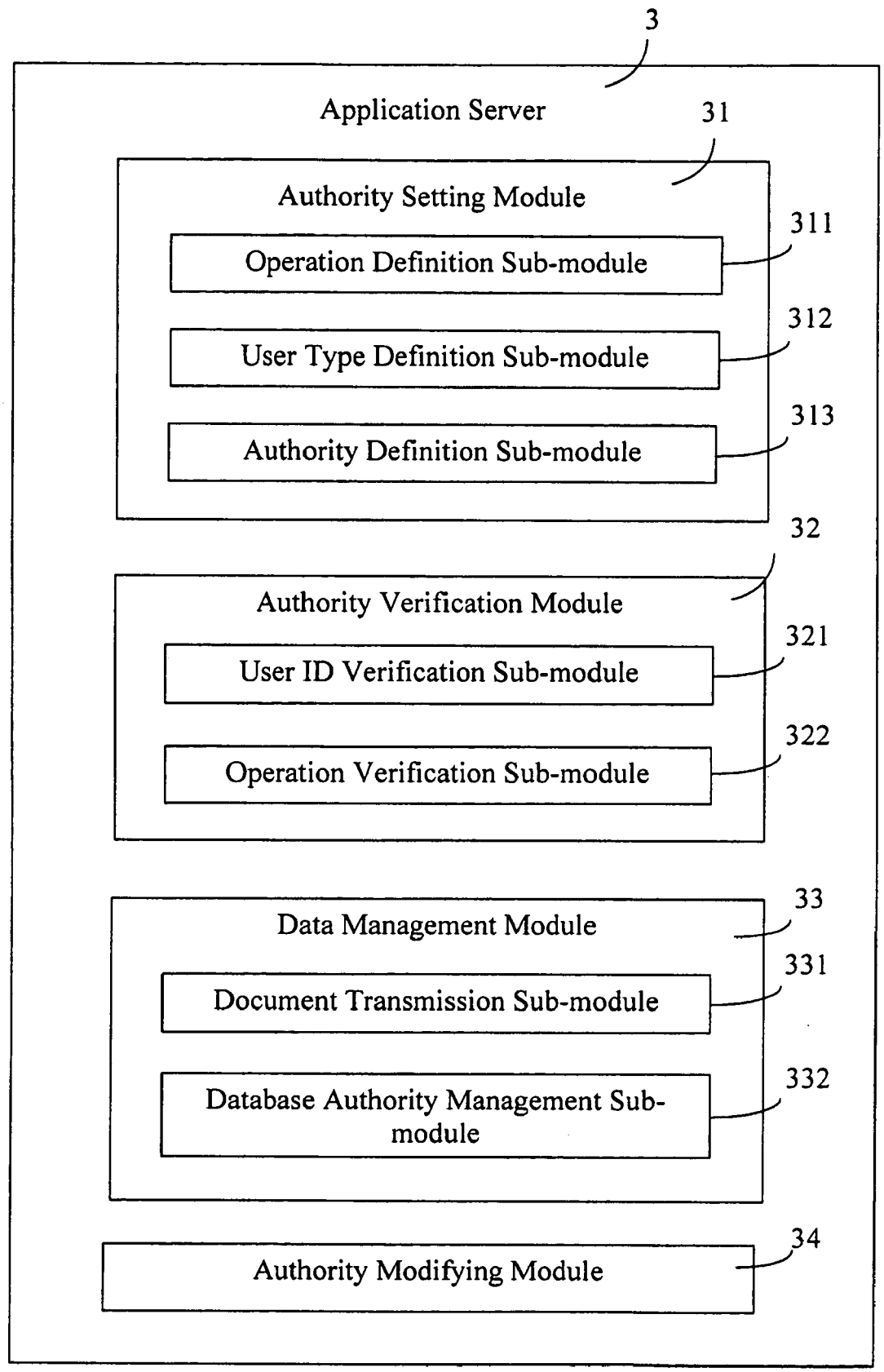
FIG. 3 is a schematic diagram of function modules of an application server of the system of FIG. 1.

FIG. 3 is a schematic diagram of function modules of the application server 3. The application server 3 comprises an authority setting module 31, an authority verification module 32, a data management module 33, and an authority modifying module 34. The authority setting module 31 comprises an operation definition sub-module 311 for defining system operations, a user type definition sub-module 312 for defining user types, and an authority definition sub-module 313 for defining user authorities. The authority verification module 32 comprises a user ID verification sub-module 321, and an operation verification sub-module 322. The user ID verification sub-module 321 is for verifying passwords input by users. As a user or an administrator logs on the system from one of the client computers 1 or administrator computers 4, the user verification sub-module 321 reads the verification data previously stored in the system database 6 to check whether the user is legitimate. If the user is verified as legitimate, the user ID verification sub-module 321 sends a corresponding message to the data management module 33, and allows the user to access the system. If the user is verified as illegitimate, the user ID verification sub-module 321 sends another message to the client computer 1 or administrator computer 4, and forbids the user from entering the system. The operation verification sub-module 322 reads user authority data in the system database 6 to check whether the user operations are legitimate. The authority modifying module 34 provides an interface for administrators to modify the contents of the ACLs 10.

The data management module 33 comprises a document transmission sub-module 331, and a database authority management sub-module 332. These two sub-modules 331, 332 receive messages from the authority verification module 32, and reply to the messages. When the authority verification module 32 sends a message verifying legitimacy of an administrator to the document transmission sub-module 331, the document transmission sub-module 331 exports corresponding ACLs 10 to a designated location in organized (.pdf, .tif etc.) or non-organized (.xls, .mdb etc.) documents according to requests of the administrator. When the authority verification module 32 sends a message verifying legitimacy of an administrator to the database authority management sub-module 332, the database authority management sub-module 332 executes requests of the administrator to add, delete, edit or modify information of ACLs 10.

Figure 4:
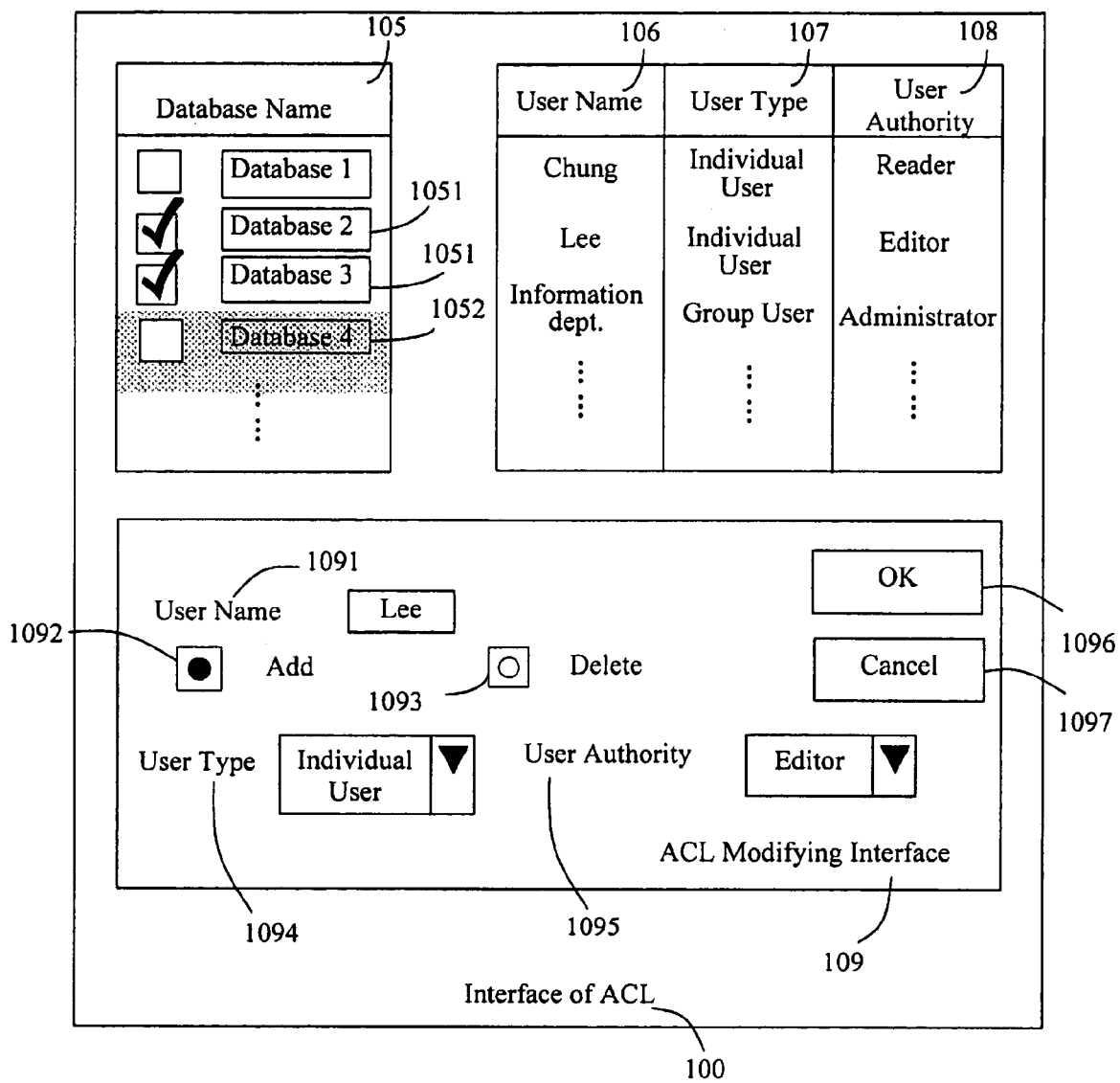
FIG. 4 illustrates an exemplary interface of an ACL used in the system of FIG. 1.

FIG. 4 illustrates an exemplary interface 100 of an ACL 10 used in the system. The interface 100 comprises a database name list 105, a user name list 106, a user type list 107, a user authority list 108, and an ACL modifying interface 109. The database name list 105 shows names of all the databases 8. In the database name list 105, administrators can select a plurality of databases 1051 at any one time (e.g. the database 2 and the database 3 shown in FIG. 4), or simply select a single database 1052 (e.g. the database 4 shown in FIG. 4). For example, when the database 1052 is selected, user names corresponding to the database 1052 are automatically displayed in the user name list 106. User types and user authorities corresponding to the user names are also automatically displayed in the user type list 107 and user authority list 108 respectively. For convenience, in the user name list 106, the user names may instead appear as user ID numbers. The user types in the user type list 107 may include "Individual User," "Group User" and "Invalid User." The user authorities in the user authority list 108 may include "Reader", "Editor," "Writer" and "Administrator." The ACL modifying interface 109 comprises a user name input column 1091, an "Add" button 1092, a "Delete" button 1093, a "User Type" dropdown menu 1094, a "User Authority" dropdown menu 1095, an "OK" button 1096, and a "Cancel" button 1097. The user name input column 1091 is a field in which an administrator inputs a user name in order to modify that user's user type and/or user authority. The administrator modifies or deletes user names, user types, and user authorities by clicking on the "Add" button 1092 and the "Delete" button 1093 respectively. The "User Type" dropdown menu 1094 comprises items for "Individual User," "Group User," and "Invalid User." The "User Authority" dropdown menu 1095 comprises items for Editor, Reader, Writer, and Administrator.

Figure 5:
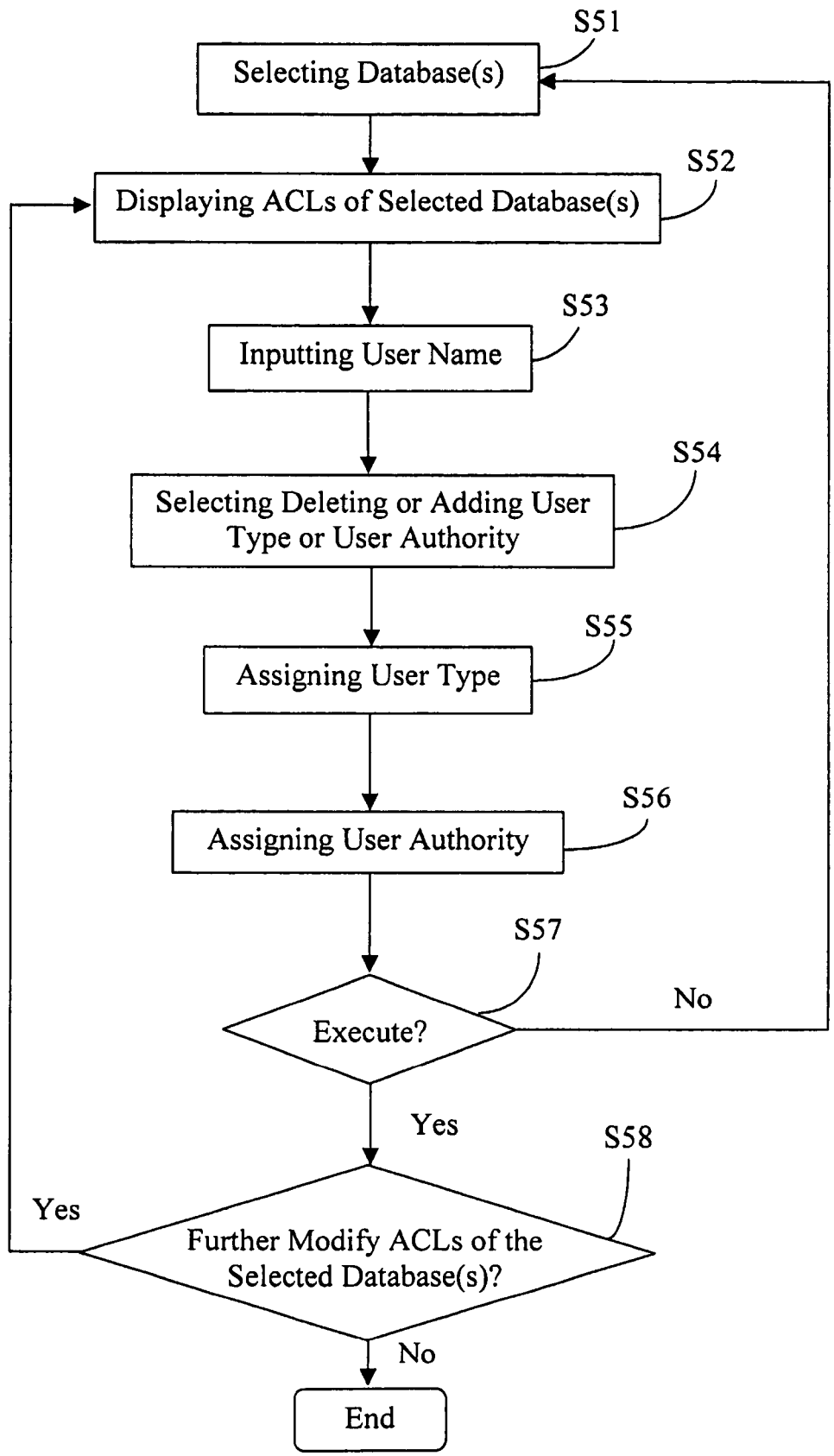
FIG. 5 is a flow chart of a preferred method for adding, deleting and modifying a plurality of authorities regarding one user by using ACLs.

FIG. 5 is a flow chart of a preferred method for adding, deleting and modifying a plurality of authorities regarding one user by using ACLs. Referring also to FIG. 4, in step S51, an administrator selects databases 1051 for which he/she wants to change the contents of user authorities. In step S52, the authority modifying module 34 displays the ACL modifying interface 109 which can be used to modify said contents in respect of the selected databases 1051. In step S53, the administrator inputs a user name in the user name column 1091. For example, the administrator inputs the name "LEE." In step S54, the administrator can delete the name "LEE" listed on the ACLs 10 of the selected databases 1051 by clicking on the "Delete" button 1093. The administrator also can add or modify the user type and user authority for "LEE" by selecting the "Add" button 1092, the "User Type" dropdown menu 1094, and the "User Authority" dropdown menu 1095. In step S55, the administrator may assign "LEE" entered in the user name column 1091 to have the individual user type, by selecting "Individual User" in the "User Type" dropdown menu 1094. In step S56, the administrator may assign "LEE" entered in the user name column 1091 to have the editor user authority, by selecting "Editor" in the "User authority" dropdown menu 1095. In step S57, the administrator clicks on the "OK" button 1096 to execute the relevantselection, or clicks on the "Cancel" button 1097 to end the relevant selection. If the administrator ends the relevant selection, the procedure goes back to step S51. In step S58, the administrator can further modify any of the ACLs 10 of the selected databases 8, in which case the procedure goes back to step S52. Otherwise, the procedure is ended.

Although the present invention has been described in language specific to structural features and/or methodological steps, it is to be understood that the invention defined in the appended claims is not necessarily limited to the specific features or steps described above. Rather, the above-described specific features and steps are disclosed as preferred forms of implementing the claimed invention.

What is claimed is:

1. A system for controlling user authorities to access one or more databases, the system comprising at least one client computer, at least one administrator computer, an application server, a database server, and a system database, wherein:

the application server comprises:
an authority setting module for defining system operations, user types and user authorities for ACLs (access control lists), wherein the system operations comprise editing users and databases, and assigning user authorities and databases to corresponding users, and each of the ACLs comprises:
a database name list for displaying database names;
a user name list for displaying user names corresponding to one or more selected databases;
a user type list for displaying user types related to the selected databases;
a user authority list for displaying user authorities related to the selected databases; and
an ACL modifying interface for adding or deleting user authorities; and
a data mangement module comprising;
a document transmission sub-module for exporting the ACLs stored in the system database to a designated location; and
a database authority management sub-modile for administrators to add, delete, edit, or modify contents of the ACLs; and
the system database stores the ACLs, operation definition data, type definition data and authority definition data.

2. The system as claimed in claim 1, wherein the application server further comprises an authority verification module, the authority verification module comprising:
a user ID verification sub-module for verifying passwords input by users; and
an operation verification sub-module for checking whether operations requested by users are legitimate.

3. The system as claimed in claim 1, wherein the authority setting module comprises:
an operation definition sub-module for defining system operations;
a user type definition sub-module for defining user types, the user types comprising individual user, group user, and invalid user; and
an user authority definition sub-module for defining user authorities.

4. The system as claimed in claim 1, wherein the ACL modifying interface comprises:
a field for an administrator to input a user name, in order to modify that user's user type or user authority;
a button for adding an input user name;
a button for deleting an input user name;
a dropdown menu for selecting a user type; and
a dropdown menu for selecting a user authority.

5. The system as claimed in claim 4, wherein the dropdown menu for selecting a user type comprises the items individual user, group user, and invalid user.

6. The system as claimed in claim 4, wherein the dropdown menu for selecting a user authority comprises the items reader, writer, editor, and administrator.

7. A computer-enabled method for adding, deleting or modifying one or more computer system authorities of a user by using one or more ACLs (access control lists), the method comprising the steps of:
providing a document transmission sub-module for exporting one or more ACLs according to selected one or more databases for changing of one or more authorities of the user relating thereto;
displaying the ACLs of the selected databases, and displaying user authorities related to the selected databases;
inputting the user's name or identification;
selecting, deleting, modifying, or adding a user type or user authority;
assigning a user type or user authority to the user; and
executing the selection and assignment for administrators to add, delete, edit, or modify contents of the ACLs accordingly.

* * * * *